May 31, 1927.

W. G. COX 1,630,374

AUTOMOBILE BUMPER AND FITTING

Filed Sept. 15, 1923  3 Sheets-Sheet 1

Inventor
W. G. Cox

By Fisher, Moser & Moon
Attorneys

May 31, 1927.

W. G. COX 1,630,374

AUTOMOBILE BUMPER AND FITTING

Filed Sept. 15, 1923    3 Sheets-Sheet 2

Inventor
W. G. Cox

By Fisher, Moser & Moor
Attorneys

May 31, 1927.　　　　　W. G. COX　　　　　1,630,374
AUTOMOBILE BUMPER AND FITTING
Filed Sept. 15, 1923　　　3 Sheets-Sheet 3

Inventor
W. G. Cox

By Fisher, Moser & Moore
Attorneys

Patented May 31, 1927.

1,630,374

UNITED STATES PATENT OFFICE.

WILLIAM G. COX, OF CLEVELAND, OHIO, ASSIGNOR TO THE EATON AXLE AND SPRING COMPANY, A CORPORATION OF OHIO.

AUTOMOBILE BUMPER AND FITTING.

Application filed September 15, 1923. Serial No. 662,830.

This invention pertains to automobile bumpers, and in general my object is to provide an improved construction and assembly of bumper parts for attachment and use at the rear end of an automobile where a fuel tank and the side bars of the chassis frame are partly or wholly covered by aprons and the formation of the chassis frame and presence of a tire carrier and spare tire make it difficult to mount a bumper with convenience and despatch and in a stable protective position upon the frame opposite and relatively close to the mud guards or wheel fenders.

In the accompanying drawings, Fig. 1 is a horizontal plan of the rear end of an automobile equipped with my improved bumper, and showing a tire carrier in section and a tire in dotted lines nested between the bumper impact ends, and Fig. 2 is a rear elevation of the same parts.

Figure 1:
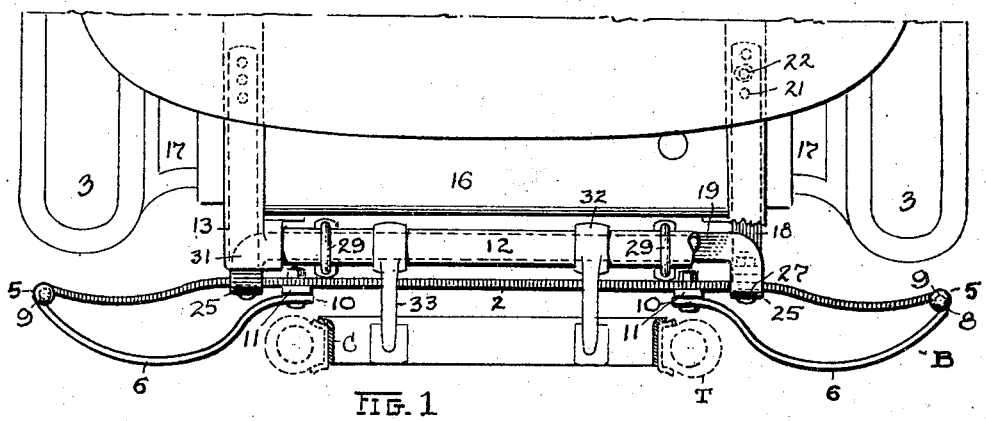
Figure 2:
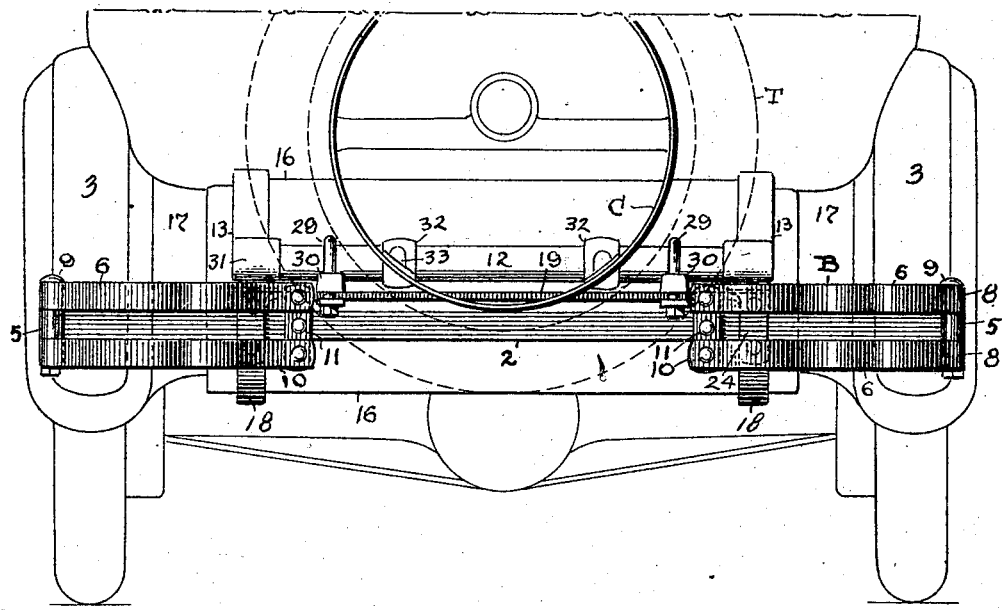
Figure 3:
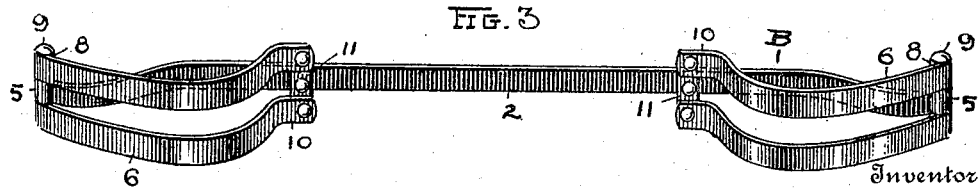
Fig. 3 is a perspective view of the bumper itself without its supporting fitting.
Figure 4:
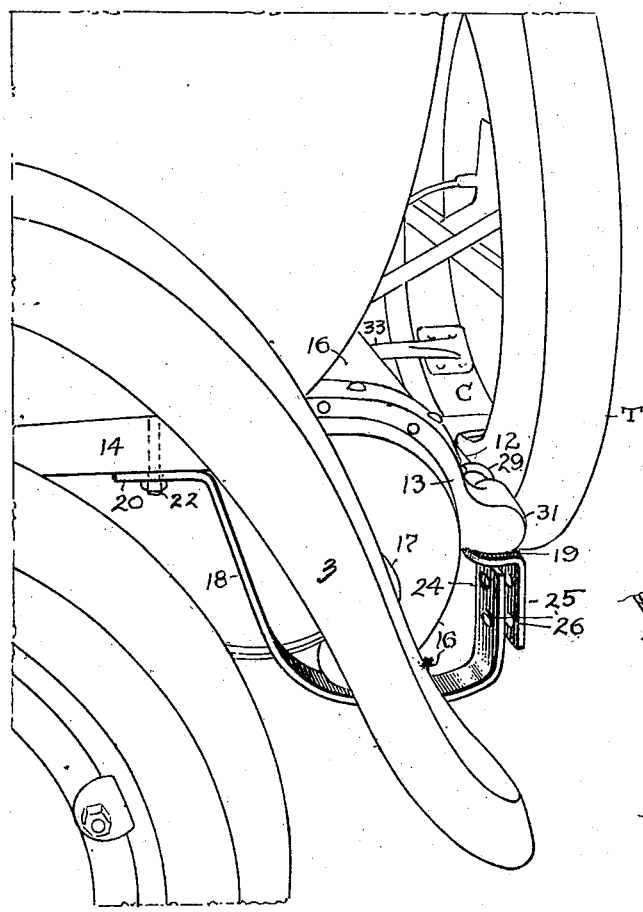
Fig. 4 is a perspective view of the rear end of an automobile looking inward beneath a mud guard to disclose the supporting fitting for the bumper which is wholly removed and not shown in this figure.
Figure 5:
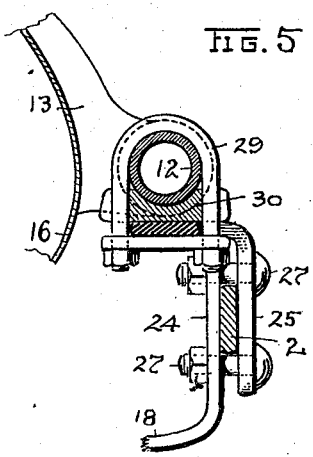
Fig. 5 is an enlarged cross section of the rear cross bar or tube forming an end part of the chassis frame, together with portions of the fittings and clamping parts for the bumper.
Figure 6:
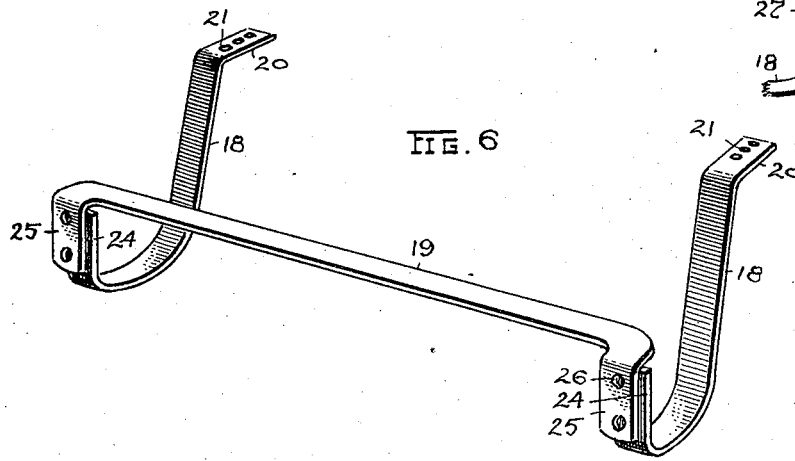
Fig. 6 is a perspective view of the clamping and bracing fitting for the bumper.
Figure 7:
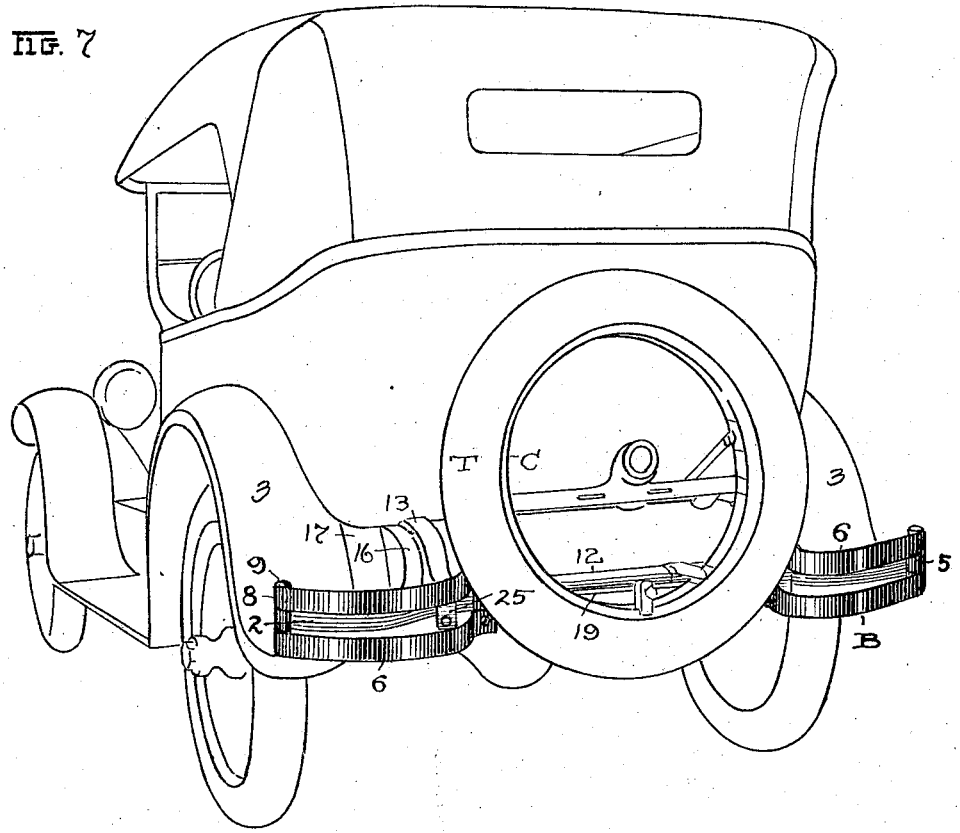
Fig. 7 is a perspective view of an automobile carrying a spare tire and having my improved bumper mounted in a flanking position in respect thereto.

A tire carrier and spare tire mounted in an upright position at the rear of an automobile serve to protect the vehicle to some extent from rear end shocks and bumps. The tire is also thereby located in an accessible place for convenient removal and replacement. However, the spare tire does not afford complete protection inasmuch as the fenders or mud guards at the opposite sides of the car are not overlapped by the tire, and damage can be inflicted, either in backing or parking the vehicle or by colliding with other vehicles. I have therefore devised the present bumper B which comprises a bar 2 adapted to span the vehicle fully at its rear so as to project across and protect the fenders or mud guards 3, and the projecting ends of the bar may be straight or curved continuations of the straight middle portion of the bar. A bend or eye 5 may be formed at the opposite extremities of bar 2 to facilitate the attachment of one or more short impact sections 6 to the bar. These sections 6 may be made of flat spring metal and bowed or arched prominently between their end connections with the bar so that the protruding portion of each section 6 will lie in substantially the same vertical plane as the spare tire or extend beyond the same to receive or divide the impact of a collision. As shown in Figs. 1 to 7 the outer end of each impact section 6 is formed with an eye 8 to permit a hinged connection to be made with eye 5 of the bar, using a pin or bolt 9 through the eyes and placing complementary sections above and below horizontal bar 2. The inner ends of each pair of impact sections 6 are curved more abruptly than their outer impact ends and terminate in short flat extremities or feet 10 to permit a bolted or riveted union with a short vertical cross piece 11 which is itself bolted at its middle to the flat face of bar 2. Single bar 2 is thus expanded or widened vertically and jutted horizontally at its opposite ends to provide exceptionally efficient impact areas opposite the fenders or mud guards at each side of the spare tire, and the bowed shape of the impact sections provide slanting impact faces adapted to ward off glancing blows and also adapted to permit sharp turning movements of the vehicle in crowded places without hooking or interference with the projecting parts of other cars or objects situated near by or closely thereto.

The separate pairs of impact sections are also spaced apart sufficiently to freely accommodate or nest the spare tire therebetween, and the straight middle connecting portion or main body of bar 2 is entirely hidden behind the spare tire, and being arranged upright it occupies very little room and may be readily interposed between the spare tire T or tire carrier C and the round cross bar 12 which is used as a tie member in certain types of cars for the end extensions 13 of the side bars or longitudinal channel members 14 of the chassis frame. In many automobiles, the fuel tank 15 is mounted between the side bars 14 and also covered from view by an apron 16, and in recent Buick models this apron extends downwardly around the fuel tank and is also flanked by additional covering pieces 17 which close the gaps between the wheel fenders and the ends of the fuel tank. As a result the channel members or side bars 14 of the chassis frame are completely enclosed and the covering aprons prevent convenient attachment of the bumper directly or soley to the end extensions 13 or side bars 14. I have, therefore, devised a supporting attachment or fitting for the bumper herein described, adapted to effect facile connections and a braced stable support. Thus, referring to Fig. 6, I provide a pair of complementary bracket members 18—18 and a connecting bar 19 therefor, which are adapted to be used together to attach and support bumper B or its equivalent upon the vehicle frame. Each bracket member 18 is made of a flat strip of metal bent horizontally at one end to form a flat attaching foot 20 having one or more bolt holes 21 to permit bolting of this part to the bottom face of side bar 14 at a point underneath the body of the vehicle. A bolt 22 is usually provided at this point to secure the body to the side bar and the same bolt may be used to fasten bracket member 18 thereto. This bracket member 18 extends downwardly from the foot 20 on a straight slanting line and is thence curved upwardly around the lower edge of the apron 16, the outer end 24 extending vertically upward to within a short distance of the round tie member 12 of the chassis frame located outside of apron 16. Connecting bar 19 of this attachment device may be a flat strip of metal having its opposite ends bent edgewise and thence downwardly at right angles in the flat to provide short depending extensions 25 adapted to overlap the vertical extremities 24 of the two bracket members 18—18. Registering bolt holes 26 are formed within the parallel overlapping parts 24 and 25, and bumper bar 2 may be firmly but detachably clamped between these parts by nuts and bolts 27. Connecting bar 19 is adapted to be attached rigidly to the bottom of the cross tube or tie member 12 of the chassis frame by clips or yoke connections 29—29, and saddle members 30 are inserted beneath round tube 12 to provide flat clamping seats for flat bar 2 in a horizontal plane beneath the round enlargements 31 which support the ends of the tube 12 and also beneath the round enlargements 32 which support the tire carrier-arms 33 upon the cross tube. When the complete fitting is attached to the chassis frame, as described, it is largely concealed from view but is nevertheless easily attached and detached, and the fitting also provides a very rigid bracing support for the bumper herein described, or for any bumper comprising a flat cross bar or flat attachment arms adapted to be clamped between the clamping extensions 24 and 25 of brackets members 18 and cross bar 19, respectively.

Figure 8:
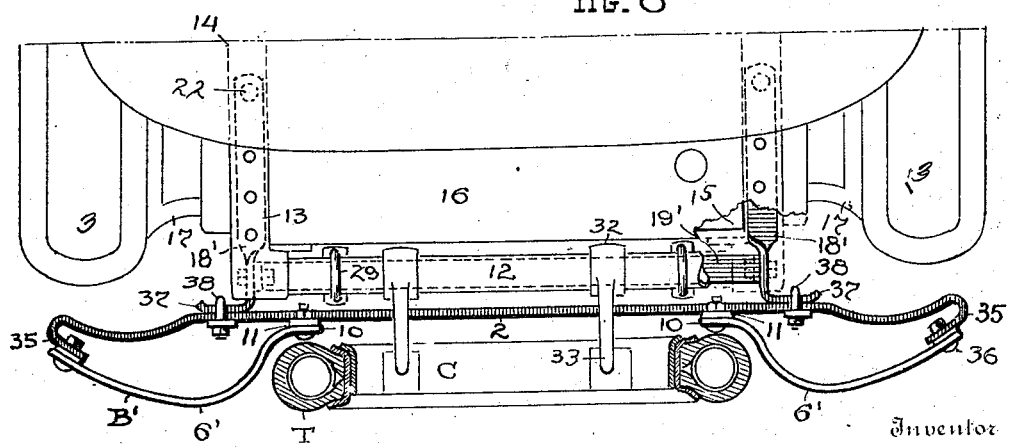
Fig. 8 is a top view of the same automobile shown in Fig. 1, but showing a modified form of the invention mounted thereon.

In Fig. 8, I show a slightly modified form of the invention, bar 2 having reverted extremities 35 instead of eyes to permit a single or double impact section 6' to be affixed thereto by rivets or bolts 36. A pair of bracket members 18', corresponding closely to brackets 18, and a single cross connecting bar 19', are shown in dotted lines in Fig. 8, fastened by bolts and clips in substantially the same way as hereinbefore described, but the clamping extremities 37 of bracket members 18' for bar 2 are bent laterally to seat the bumper bar, and clips or U-bolts 38 are used to fasten bar 2 detachably to the bent extremities 37.

What I desire to claim, is:

1. An automobile bumper having a supporting bar, and attachment fittings for said bar comprising a pair of bracket members having upwardly-extending brace portions at one end and clamping extremities at their opposite ends and a connecting bar extending between said opposite ends.

2. An automobile bumper attachment fitting, consisting of a pair of brace members having vertical attachment leg portions and vertical clamping extremities, and a transverse bar having vertical clamping extremities adapted to overlap the clamping extremities of said brace members.

3. An automobile bumper fitting, comprising a pair of brace members and connecting bar therefor; each brace member having a depressed central portion, a horizontal extremity at one end adapted to be attached to the chassis frame, and a vertical extremity at its opposite end adapted to permit a bumper part to be clamped thereto.

4. A bumper fitting for an automobile having side bars and an end cross piece, comprising a pair of brace members adapted to be affixed to said side bars and extending beneath the same to said cross piece, and a transverse bar extending lengthwise of said cross piece and connected therewith and to said brace members.

In testimony whereof I affix my signature hereto this 7th day of September, 1923.

WILLIAM G. COX.